April 11, 1961 H. F. SWENSON 2,978,966
MILLING MACHINE DEVICE
Filed June 12, 1956 4 Sheets-Sheet 1
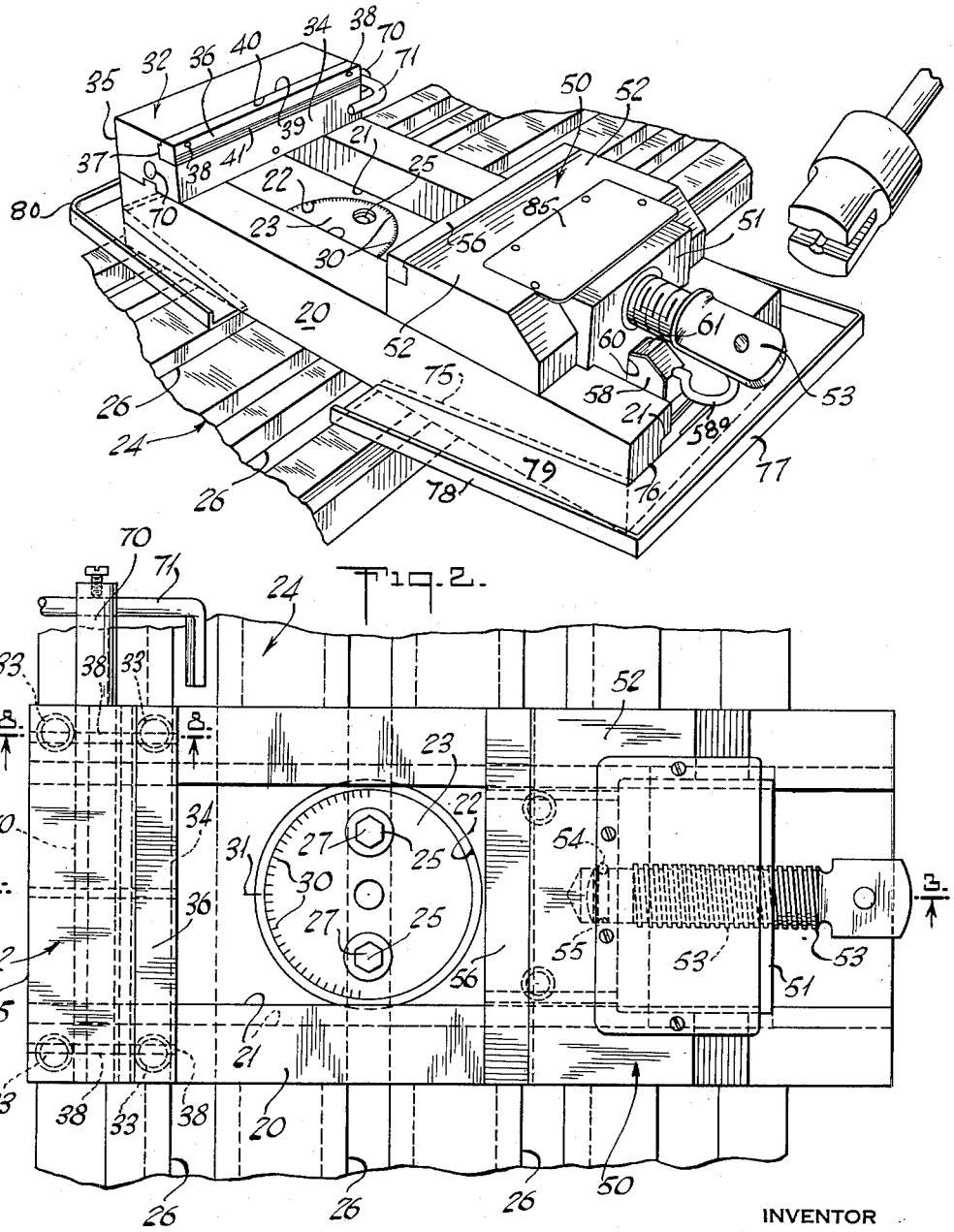
INVENTOR
HENRY F. SWENSON
BY
ATTORNEY April 11, 1961     H. F. SWENSON     2,978,966
MILLING MACHINE DEVICE
Filed June 12, 1956     4 Sheets-Sheet 2
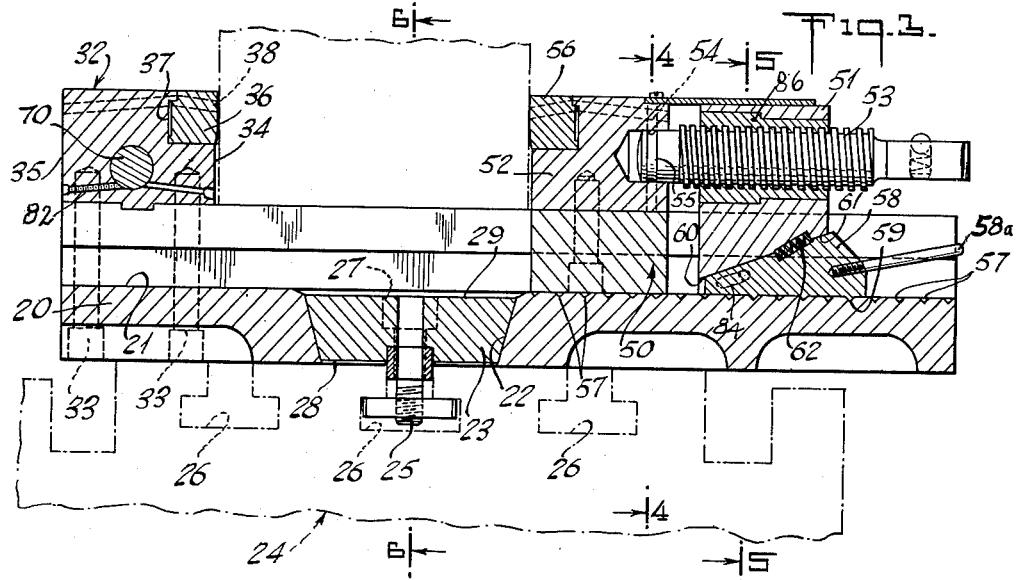
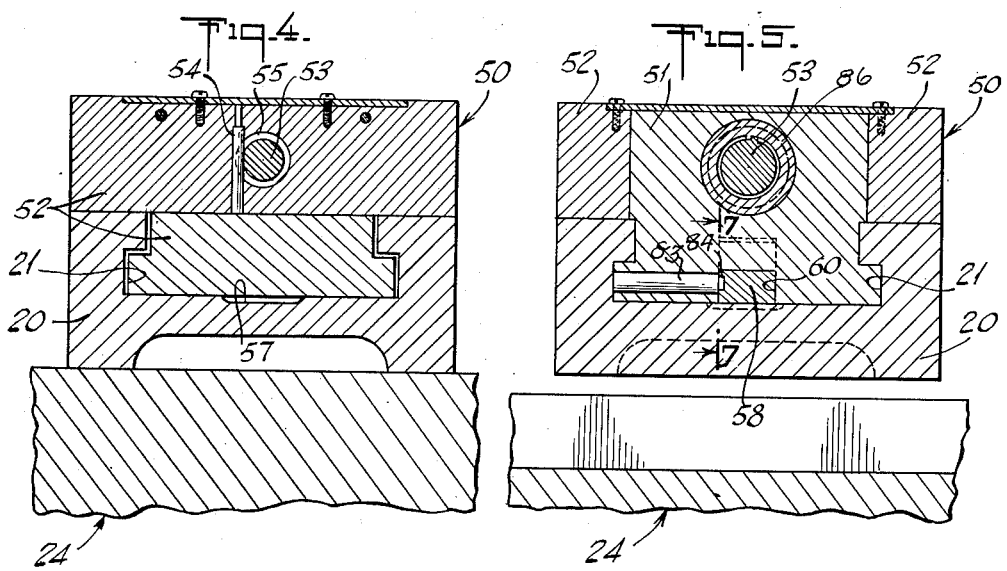
INVENTOR
HENRY F. SWENSON
BY
ATTORNEY

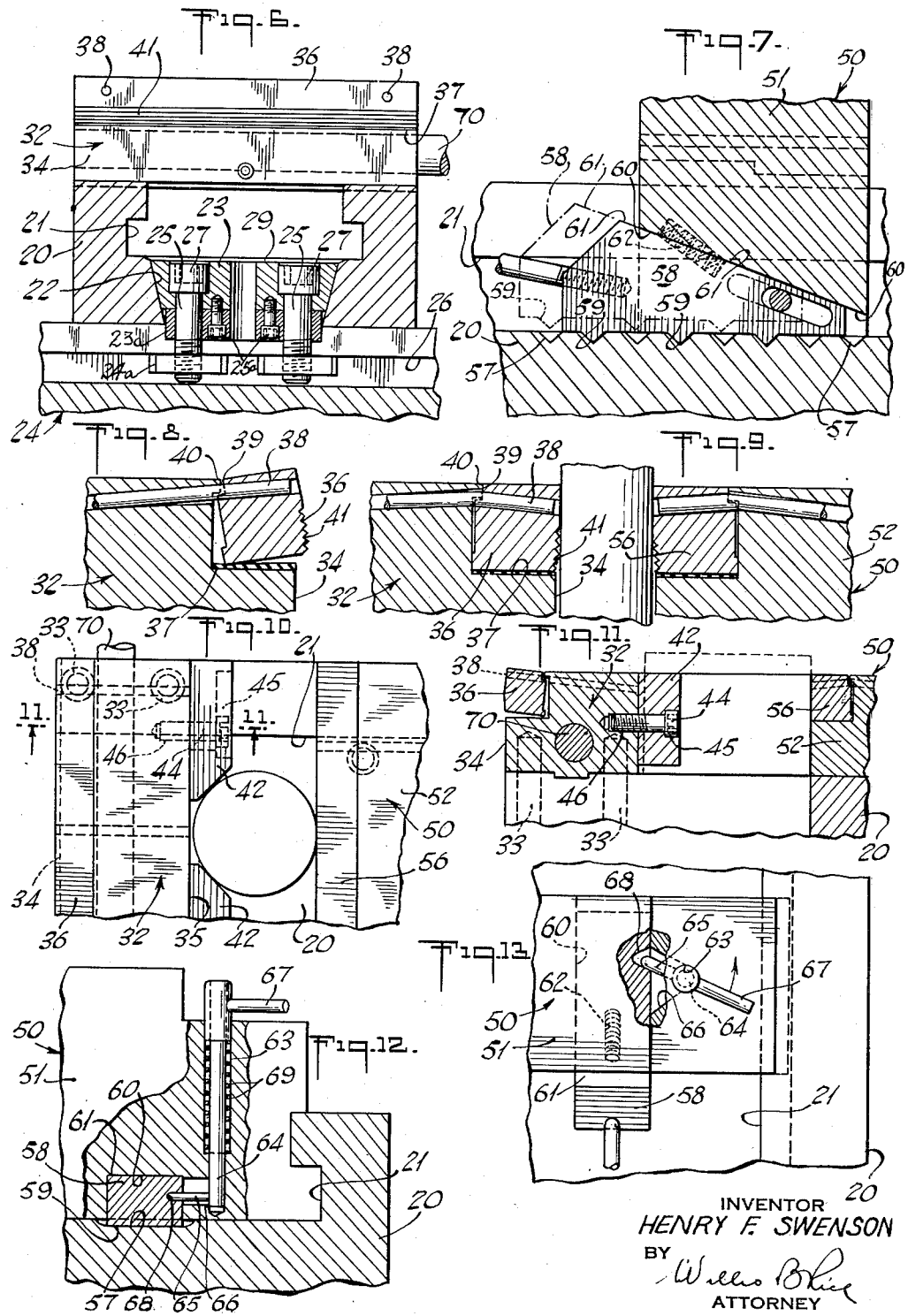

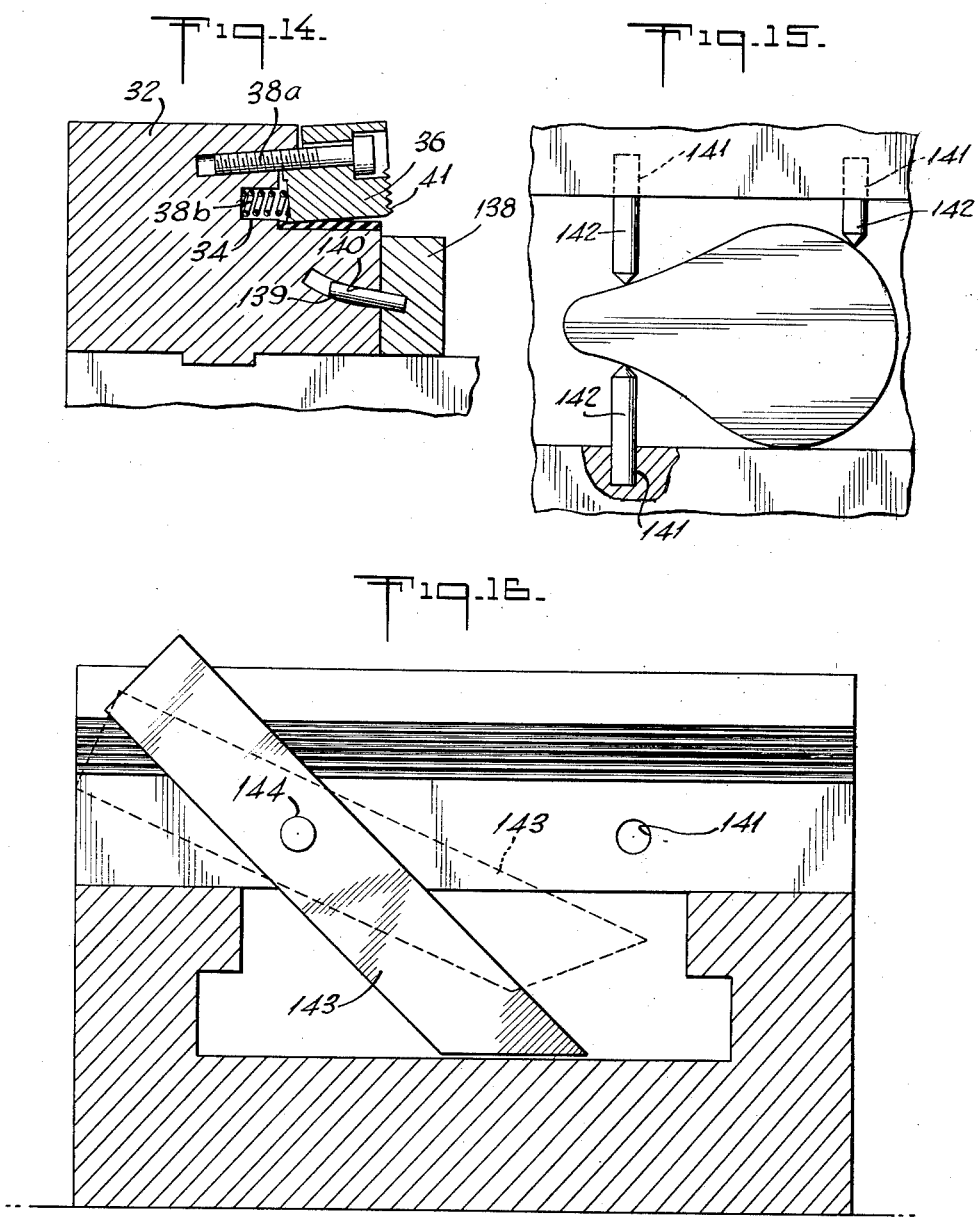

# United States Patent Office 2,978,966
Patented Apr. 11, 1961

2,978,966
MILLING MACHINE DEVICE
Henry F. Swenson, 87 Dorsa Ave., West Orange, N.J.

Filed June 12, 1956, Ser. No. 590,888

7 Claims. (Cl. 90—60)

This invention relates to a vise, particularly intended for use with milling machines, which is adapted to hold the work steadily and in exact position and yet which will permit the work to be held at any angle to the cutting instruments.

It is a further object of this invention to produce a vise of the character described which, as it grips the work, will press the work down firmly against the bed of the vise.

It is a further object to provide a device which will be readily and quickly adjustable throughout a wide range and yet which will hold the work firmly in any position.

This invention accordingly comprises a vise, an embodiment of which will be hereinafter described, which is shown in the accompanying drawings, in which: Fig. 1 is a perspective view of a vise embodying the invention as attached to the bed of a milling machine or the like; Fig. 2 is a top plan view of the same; Fig. 3 is a section on the line 3—3 of Fig. 2; Fig. 4 is a section on the line 4—4 of Fig. 3; Fig. 5 is a section on the line 5—5 of Fig. 3; Fig. 6 is a section on the line 6—6 of Fig. 3; Fig. 7 is a fragmentary section on the line 7—7 of Fig. 5; Fig. 8 is a fragmentary section on the line 8—8 of Fig. 2; Fig. 9 is a fragmentary section similar to Fig. 8 except that it shows the two jaws of the device in clamping position against the work; Fig. 10 is a top plan view showing the device used to clamp a circular piece in a predetermined position by the aid of chuck blocks; Fig. 11 is a section on the line 11—11 of Fig. 10; Fig. 12 is a section thru the movable head showing a modified construction of the control mechanism; Fig. 13 is a fragmentary top plan partly in section of the structure of Fig. 12; Fig. 14 shows a modification; and Figs. 15 and 16 show supplementary tools.

In the drawings, the number 20 is a base block having a T-shaped slot 21 throughout its length, opening upwardly. A vertical conical bore 22 is cut thru the bottom of the slot 21 into which is accurately fitted a conical clamping member 23. This clamping member 23 is attached to the machine, here labeled 24, by a pair of bolts 25 passing through openings in the member 23 and corresponding openings in the block 23a attached to the bottom of member 23 by screws 25a. The block 23a fits into the throat of the T slot and holds the clamping member 23 in accurate angular alignment with the machine 24 during adjustment. All these parts are held in fixed alignment by nuts 24a fitting against the inner flanges of the T slot 26. As shown, these bolts have heads 27 in recesses in the clamping member 23, so that the clamping member 23 may be tightened or loosened from above.

As will be seen in the drawings, clamping member 23, when in its lower position, is slightly spaced from the bed of the machine, as shown at 28, to give clearance; and similarly, its upper face 29 is below the level of the bottom of the T-shaped slot 21, so as to permit the sliding parts to ride over the conical block. The upper face of clamping member 23 is provided with graduations 30 registering with an index mark 31 upon the bottom of the slot 21, by which the angular position of the base block 20 upon the bed of the machine may be set at will.

The stationary jaw 32 is clamped to one end of the base block 20 by bolts 33 and this jaw has two faces, 34 and 35, either one of which may be used as a clamping face. The face 34 is provided at its upper edge with a clamping bar 36, inserted into a mating recess 37 in the upper corner of the stationary jaw 32, and it is spring-pressed outwardly by a spring pin 38 which extends thru the bar and into the stationary jaw near the upper edge of both.

The sockets to receive the spring pin 38 are such that the pin tends to rotate the clamping bar counter-clockwise about its upper edge, as seen in Fig. 8, so that on clamping the work in place it is the lower portion of the clamp bar 36 which will first engage the work and then, as pressure is applied, the jaw will rotate about its upper backward edge, bending the pin 38, and in this manner the work is held firmly down against the bed of the machine.

There is sufficient clearance provided around the mid-portion of the pin so that the bending of the pin will not be concentrated at one point. The clamping bar has its corner recessed at 39 to receive a ridge 40 in the jaw, so that when the clamping bar is bent inwardly, as above described, this ridge and mating recess will engage to take a portion of the strain of pressing the work downwardly against the bed. The clamping bar 36 may be provided with teeth 41 sufficient to prevent slippage against the work. As will be seen, a similar clamping bar is provided on the movable jaw.

With a vise of common construction, as the jaws are brought into clamping relationship there is a tendency for the jaws to move upwardly, lifting the work piece away from the bed of the clamp. Means have been proposed to overcome this difficulty, but these have not proved wholly satisfactory.

In accordance with this invention, the work is first engaged by the teeth 41 upon the bar 36 and a similar bar 56 on the other jaw 62. The tendency of the jaw to rise off its bed, in so far as its working clearance permits, is overcome by the downward movement of the teeth 41 as they rotate inwardly about the pivot point within the spring in 38, and this downward movement is adjusted to overcome any tendency of the work to rise above the bed.

The other face 35 of the stationary jaw is provided with means for attaching chuck blocks 42, see Fig. 10, so that the jaw may firmly engage work which does not have a flat face, such, for example, as a vertically disposed cylinder, as shown in Fig. 10.

The means of attachment of the chuck blocks is here conventionally shown as bolts 44 moving in slots 45 in the chuck block and screwing into holes 46 in the stationary jaw.

The movable member 50 of the vise comprises, primarily, a settable member 51 and a sliding work-engaging jaw 52 which are connected by a screw 53 threaded into the settable member and bearing against the sliding jaw. There is, as usual, a suitable means 54 engaging a groove 55 in the screw 53 to permit the screw to move the sliding jaw in either direction. Both the members 51 and 52 are shaped to fit within the T slot 21, by which they are slidingly held to the base block 20. The sliding jaw 52 is provided with a clamping bar 56 similarly constructed to the clamping bar 36.

Means are provided readily to clamp the settable member 51 at various positions on the bottom of the T slot 21. As here shown, a plurality of transverse V-shaped grooves 57 are cut at regular intervals along the bottom of the slot. A dog 58 has teeth 59 adapted to mate with the grooves 57. This dog fits within a recess 60 in the settable member 51, and the upper face 61 of the dog and the corresponding face of the recess 60 are inclined upwardly and backwardly so that when the settable member is moved to the right, as seen in Fig. 3, the teeth 59 are forced into the grooves 57. A spring 62 bears against the settable member 51 and the dog 58, to urge the dog into engagement with the base block 20.

With this construction it will be clear that if the member 51 be thrust to the right, as seen in Fig. 3, by the pressure of the screw 53, the dog 58 will be held in place by its teeth and the settable member 51 will ride up on the inclined surface until it locks—whereupon any further thrust by the screw will be exerted on the sliding jaw 52. The locking of member 51 may be released after the pressure is removed by screw 53, by moving member 51 forward and then pulling the dog 58 back by finger piece 58a.

It will be noted, moreover, that the construction of the dog 58 is such that the movable element may be slid back and forth, without obstruction, so long as the finger piece 58a is held in releasing position, but that it will immediately lock against the bed when the finger piece is released.

In Figs. 12 and 13 there is shown an alternative means of controlling the dog 58. To accomplish this result there is journalled in a vertical bore 63, in member 51, a pin 64 carrying at its lower end an arm 65 moving in a recess 66 in member 51, and extending into a recess 68 in dog 58. This pin has a handle 67 by which the pin may be rotated. The movement of the dog 58 requires that it move vertically to raise its teeth 59 over the edge of the groove 57. This is accomplished by permitting end-wise, that is, vertical, movement of the pin 64, and providing a spring 69 surrounding the pin and urging the pin upward.

A transverse pin 70 (see Figure 1) is mounted in the stationary jaw 32 carrying a stop 71 whereby successive work pieces may be placed in exact position. This pin 70 may be locked in adjustable position by any suitable means.

For the purpose of controlling the flow of cooling fluid there are cut in the sides and front of the block 20 grooves 75 and 76 slanting back and downwardly to receive the face edges 77 and side edges 78 of an apron 79, this apron extending back onto the face 24 of the machine. A similar apron 80 is similarly mounted on the side and back of the block 20.

There are several mechanical features which contribute to the operation of the vise. Referring to Fig. 3, set screws 82 set into the jaw 32 hold the pin 70 in adjusted position. A pin 83 in member 51 extends into the slot 84 in dog 58, parallel to the inclined upper face of said dog to hold it in proper relation to settable member 51. A plate 85 attached to member 50 extends over member 51 and a bushing 86 is inserted in the member 51 to carry the female threads which mesh with screw 53.

The block 138 shown in Fig. 14 may be used to support work pieces above the level of the bed. It may be detachably held in place by pin 140 slipping into a slot 139, the pin and slot being shaped as to hold the block in place by the spring action of the pin.

The construction shown in Figures 15 and 16, as will be obvious from the drawing itself, discloses various recommended ways of supporting work pieces in the clamp. In Figure 15 there is provided in recesses in the jaws of the clamp faces a plurality of pins 142 extending outwardly to engage irregularities in the work piece, and since such pins may be of any desired length they make it possible to hold within the clamp articles having a wide variety of contours. In the construction shown in Figure 16 there is shown an inclined bar 143 held by a pin 144 in one face of the clamp, and it is obvious that this bar may be of any inclination desired, having its free end resting upon the base member or at any other angle as shown in dotted lines in Fig. 16. This bar may be held by a pin or bolt 144.

What I claim is:

1. A machine vise comprising a base having a fixed jaw thereon, and a sliding jaw, slidable to co-operate with said fixed jaw, each jaw having a cutout at its upper edge and a bar mounted in said cutout, each of said bars being pivoted to its jaw at its upper inner edge and having a work-engaging face on its outer side, spring means for urging said bar outwardly about its pivot, whereby on clamping a work piece between said jaws, each bar is rotated about its pivot to force the work downwardly against the base.

2. A device in accordance with claim 1 in which said spring means comprises a spring pin extending thru said bars and jaw.

3. A clamping device for use with a machine provided with a bed having T slots, said device comprising a base member adapted to rest on said bed and having a fixed jaw thereon, said base member having a vertical conical bearing surface with the smaller diameter at the bottom, a cone shaped clamp member fitting within said bearing surface, but not extending clear to the smaller diameter thereof, whereby it does not engage said machine bed, said clamp member having a key slot in its underface, a lock member having a key portion fitting into said slot and having a body adapted to engage the throat of the T shaped slot in the bed of the machine, whereby said clamping member is fixed against rotation relative to said bed, a nut within said slot and a screw extending downwardly through said conical member and engaging said nut for clamping said member against said bed.

4. A device according to claim 3 having a movable jaw adapted to be fixed at different positions thereon and adjustable from each said fixed position.

5. A machine device for use with a machine provided with a bed having T slots, said device comprising a base member adapted to rest on said bed, said member having a fixed jaw thereon, said base member having a vertical conical bearing surface with the smaller diameter at the bottom, a cone shaped clamp member fitting within said bearing surface, but not extending clear to the smaller diameter thereof, said clamp member having a key slot in its underface, a lock member having a key portion fitting into said slot and having a body adapted to engage the throat of a slot in the bed of the machine, whereby said clamping member is fixed against rotation relative to said bed, a nut within said slot and a screw extending downward through said clamp member and engaging said nut for clamping said clamp member and said base member against said bed, said base member having grooves in its outer side faces inclined downwardly toward the center for receiving the side edges of aprons.

6. A device in accordance with claim 3 in which said base member and said conical member are provided with cooperating angular indexes.

7. A vise comprising a bed plate having a longitudinal guideway therein, a fixed jaw at one end of said guideway and a movable jaw thereon, a series of recesses positioned along said guideway, a dog having projections adapted to engage in said recesses at various positions along said guideway, said dog having a cam surface adapted to force said projections into said recesses, a settable member slidable within said guideway having a surface positioned to engage said cam surface and force said projections into said recesses when said member is moved away from said fixed jaw, a screw threaded into said settable member and positioned to engage said movable jaw, said dog comprising a block fitting into a recess in said member, said block and said member having their mating surfaces inclined upwardly away from said fixed jaw, a guide to retain the mating surfaces in contact, a spring engaging the block urging said dog to slide downwardly on the mating surfaces to bring the projections into engagement with the recesses, a vertical pin journalled in the settable member, said vertical pin having a horizontal arm at its lower end to engage said dog, a horizontal handle at the upper end of the pin in position to be moved by hand, said vertical pin being movable vertically, and a spring around the pin to urge it upwardly to assist in holding the mating surfaces in contact.

References Cited in the file of this patent

UNITED STATES PATENTS

| | | |
|---|---|---|
| 652,441 | McClellan | June 26, 1900 |
| 1,269,271 | Leopold | June 11, 1918 |
| 1,375,236 | Skinder | Apr. 19, 1921 |
| 2,274,428 | Odin | Feb. 24, 1942 |
| 2,580,585 | Odin | Jan. 1, 1952 |
| 2,641,947 | Werne | June 16, 1953 |

FOREIGN PATENTS

| | | |
|---|---|---|
| 40,350 | Switzerland | July 1, 1907 |

UNITED STATES PATENT OFFICE
CERTIFICATE OF CORRECTION

Patent No. 2,978,966                               April 11, 1961

Henry F. Swenson

It is hereby certified that error appears in the above numbered patent requiring correction and that the said Letters Patent should read as corrected below.

Column 2, line 39, for "jaw 62" read -- jaw 52 --.

Signed and sealed this 12th day of September 1961.

(SEAL)
Attest:

ERNEST W. SWIDER                              DAVID L. LADD
Attesting Officer                                Commissioner of Patents

USCOMM-DC